(12) United States Patent
Palmgren, III et al.

(10) Patent No.: US 10,034,067 B1
(45) Date of Patent: Jul. 24, 2018

(54) SYSTEM, METHOD AND APPARATUS FOR AUTONOMOUS DATA COLLECTION FROM VARIABLE FREQUENCY DRIVES

(71) Applicant: Summit ESP, LLC, Tulsa, OK (US)

(72) Inventors: Carl Albert Palmgren, III, Eufaula, OK (US); Travis Chet Johnson, Tulsa, OK (US); German Hoffman, Montevideo (UY); Fernando Suzacq, Montevideo (UY); Luke Golden Janger, Tulsa, OK (US)

(73) Assignee: SUMMIT ESP, LLC, Tulsa, OK (US)

( * ) Notice: Subject to any disclaimer, the term of this patent is extended or adjusted under 35 U.S.C. 154(b) by 0 days.

(21) Appl. No.: 15/694,361

(22) Filed: Sep. 1, 2017

Related U.S. Application Data

(60) Provisional application No. 62/464,017, filed on Feb. 27, 2017.

(51) Int. Cl.
| | | |
|---|---|---|
| *H04Q 9/00* | (2006.01) | |
| *E21B 43/12* | (2006.01) | |
| *E21B 47/00* | (2012.01) | |
| *G06F 3/147* | (2006.01) | |
| *E21B 47/12* | (2012.01) | |

(52) U.S. Cl.
CPC .............. *H04Q 9/00* (2013.01); *E21B 43/128* (2013.01); *E21B 47/0007* (2013.01); *E21B 47/12* (2013.01); *G06F 3/147* (2013.01); *H04Q 2209/40* (2013.01); *H04Q 2209/50* (2013.01)

(58) Field of Classification Search
CPC .. H04Q 9/00; H04Q 2209/40; H04Q 2209/50; H04Q 2209/00; H04Q 2209/10; E21B 47/12; E21B 43/128; E21B 47/0007; E21B 44/00; G06F 3/147
USPC ............................................ 340/853.1–856.1
See application file for complete search history.

(56) References Cited

U.S. PATENT DOCUMENTS

| | | | |
|---|---|---|---|
| 9,778,653 B1 * | 10/2017 | McClintock | ............. G05D 1/00 |
| 2009/0166034 A1 * | 7/2009 | Mundell | ................. E21B 43/12 |
| | | | 166/250.15 |
| 2010/0320837 A1 * | 12/2010 | Harrison | ................... H02J 3/36 |
| | | | 307/26 |
| 2011/0088484 A1 * | 4/2011 | Camilleri | .................. G01F 1/34 |
| | | | 73/861.42 |
| 2014/0028462 A1 * | 1/2014 | Lawson | ................. G08C 17/02 |
| | | | 340/870.01 |

(Continued)

*Primary Examiner* — Brian Wilson
(74) *Attorney, Agent, or Firm* — Gilliam IP PLLC

(57) ABSTRACT

A system, method and apparatus for autonomous data collection from variable frequency drives (VFD) is described. The system includes at least two embedded control systems, each built on a commercial platform, with customized components in transportable cases. A computer program with multiple instantiations operates on the at least two embedded control systems to provide a client-server implementation of data collection and recording units. The units communicate by Wi-Fi autonomously when the client comes within range of the server. Units do not require any direct intervention by technicians to gather and store VFD system data. The client is a mobile unit is installed in a field truck operated by a driver without the training to operate a VFD. When the mobile unit obtains a communications link to a central receiving server, the unit uploads its data for processing in a processing system.

15 Claims, 12 Drawing Sheets

(56) References Cited

U.S. PATENT DOCUMENTS

2014/0320306 A1* 10/2014 Winter .................. G01D 4/004
                                                    340/870.02
2016/0144959 A1* 5/2016 Meffert ................ B64C 39/024
                                                         701/3
2017/0210241 A1* 7/2017 Li ....................... B60L 11/1861

* cited by examiner

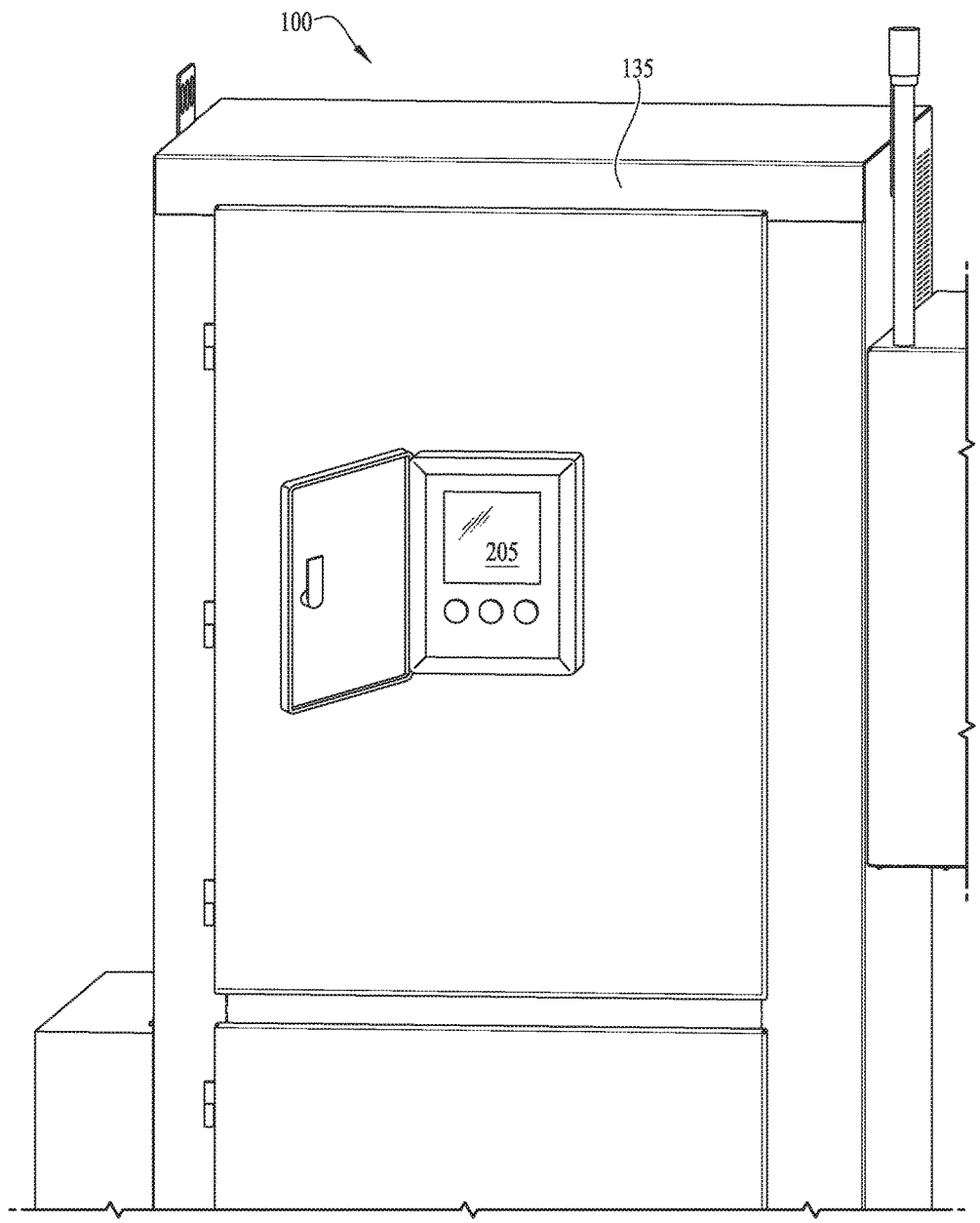

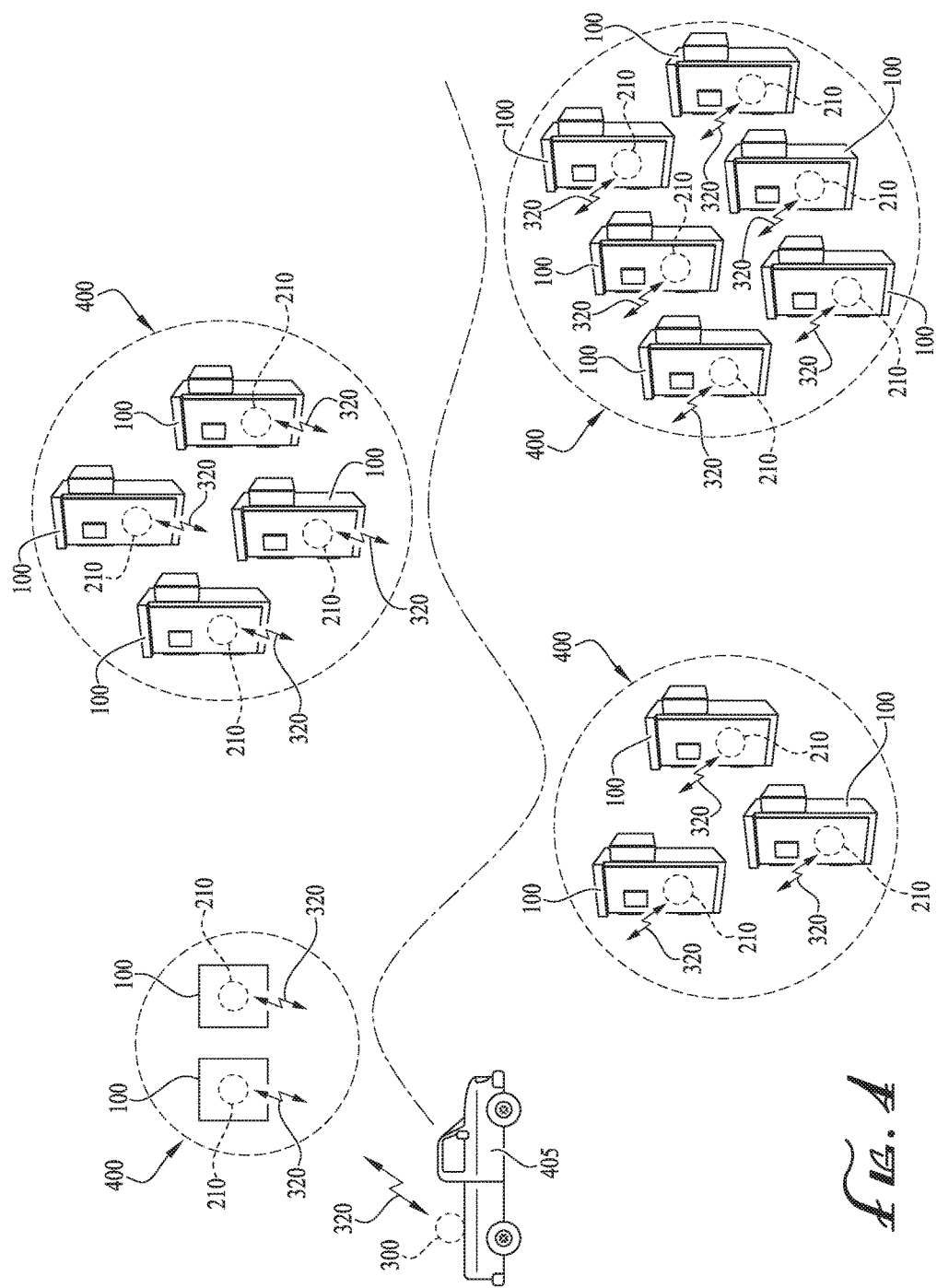

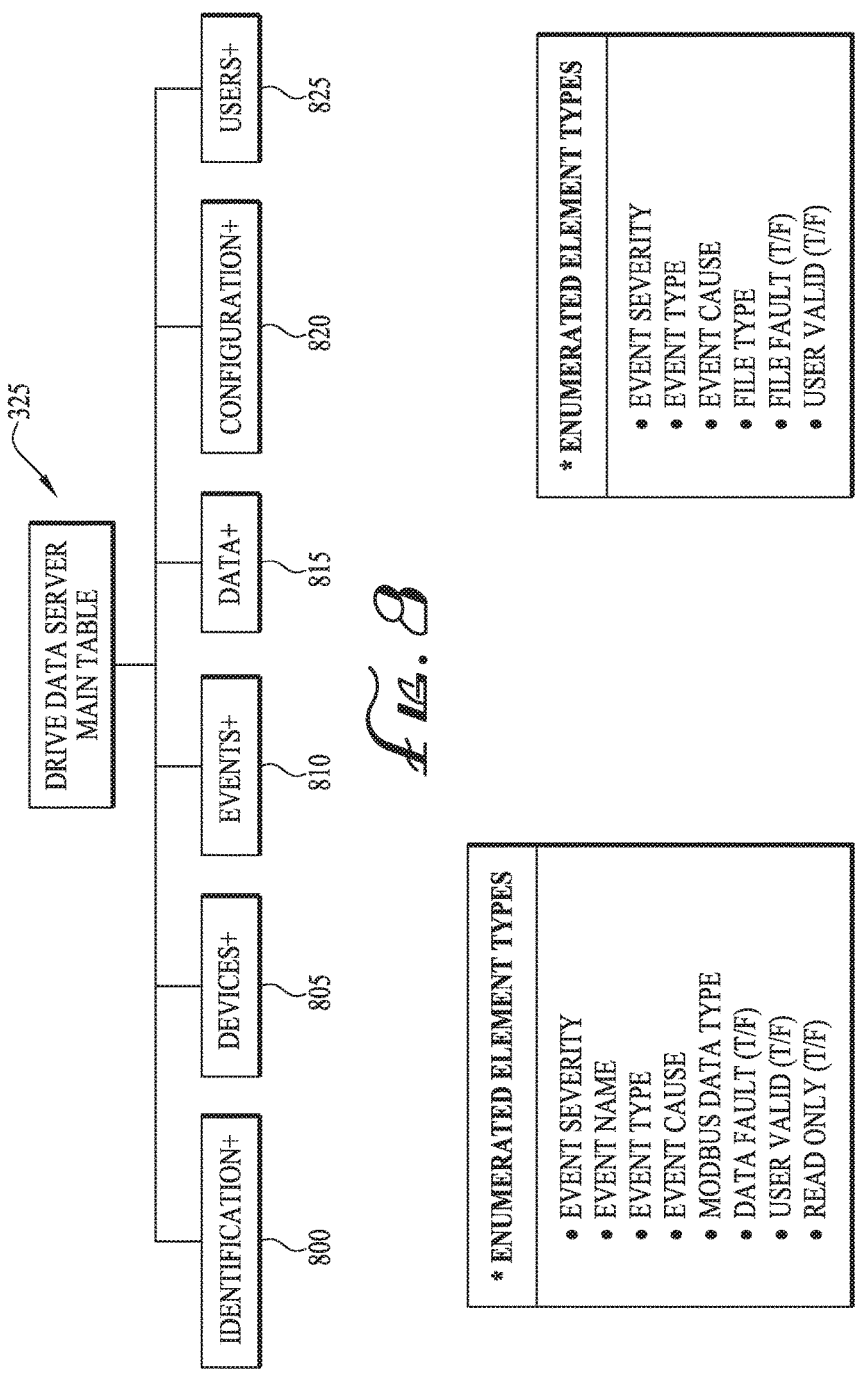

SYSTEM, METHOD AND APPARATUS FOR AUTONOMOUS DATA COLLECTION FROM VARIABLE FREQUENCY DRIVES

CROSS REFERENCE TO RELATED APPLICATIONS

This application claims the benefit of U.S. Provisional Application No. 62/464,017 to Palmgren III et al., filed Feb. 27, 2017 and entitled "SYSTEM, METHOD AND APPARATUS FOR AUTONOMOUS DATA COLLECTION FROM VARIABLE FREQUENCY DRIVES," which is hereby incorporated by reference in its entirety.

BACKGROUND OF THE INVENTION

1. Field of the Invention

Embodiments of the invention described herein pertain to the field of variable frequency drives that operate downhole electric submersible motors. More particularly, but not by way of limitation, one or more embodiments of the invention enable a system, method and apparatus for autonomous data collection from variable frequency drives.

2. Description of the Related Art

Many different applications may employ Variable Frequency Drives (VFDs), from small appliances to pump applications such as, for example, electrical submersible pumps (ESP) used in production wells for oil, water and/or gas. Production wells require an electrical submersible pump (ESP) to lift fluid from underground when pressure within the well is not enough to force oil out of the well. Well pump motors may be controlled using VFD systems. Typically in a VFD system, the drive, a VFD controller and a user interface is housed above ground at the well's surface in a cabinet to shield the devices from the elements. In some instances, the cabinet may be metal. VFD cabinets are generally located at or near the well where the ESP is deployed. The well site may be located in an area that is remote and undeveloped.

VFDs, also called variable-speed drives, adjustable frequency drives, AC drives, micro drives or inverter drives, are types of adjustable frequency drives used in electro-mechanical drive systems to control AC motor speed and torque by varying motor input frequency and voltage. The main drive may commonly be a solid-state-electronics power conversion system. An embedded microprocessor control system, such as a VFD controller, may govern the overall operation of the VFD.

Most VFD units provide input and output terminals for connecting buttons, switches and/or other operator interface devices and/or control signals. A serial communications port, modernly a universal serial bus (USB) port, or an Ethernet port, may also be available to facilitate the transfer of data files. In some configurations, trained operators may configure, adjust, monitor and control the VFD using a computer with user interface connected to a serial port of the VFD unit. Operators may use the interface to send commands to configure the various parameters and to start, stop, and control the operating speed of the ESP motor.

The VFD controller may store operational and configuration data regarding the motor, power supply, microprocessor and other elements of the VFD, to assist operators and maintenance engineers in diagnosing and maintaining the VFD unit. Different configurations of a VFD may cause significant variation in the data stored in each unit. Conventionally, the amount of data acquired by the controller is small because the memory and processing capacity of VFD controllers are limited. As a result, useful information regarding ESP motor conditions is often not recorded if the condition is transitory, not transmitted to an operator for analysis, and/or overwritten. Typically, current controllers store a handful of parameters only from the previous thirty days of operation.

The collected data is not usually transferred to a central receiving server due to difficulties in manually transferring the data and the complexity of maintaining correspondence between data and a particular well that is the source of the data. Downloaded data is only occasionally retrieved when there is a specific problem and the collected data may be helpful in resolving a problem with the well, drive, pump, or motor. When endeavored, downloading VFD data is a manual process conducted by a field technician that may take as much as 10 to 15 minutes per unit. In some instances, rather than downloading VFD data in the field, a supervisory control and data acquisition (SCADA) external system uses a network cable to send information from the VFD controller to an offsite computer. However, the SCADA systems are external to the VFD and, like the manual download process, are limited by the storage and processing capabilities of the controller. Powering an external SCADA system is also problematic because power from wells are electrically noisy.

Although VFDs have traditionally been very flexible in performing a broad range of functions, with this flexibility has come a complexity that has made it difficult to operate the VFD in an efficient and safe manner. For more than thirty years, VFDs have been dangerous and difficult to use, for example due to extreme shock hazard, which requires personnel working with VFD controllers to obtain extensive training. Setting up, monitoring and troubleshooting VFDs may be a complex process. Even data acquisition, which may require only a low-skilled technician in many other types of systems, for a VFD requires a trained technician/engineer. Personnel who are not highly trained are at risk from the high voltage power supply, risk damaging the drive, and risk damaging the well, pump, motor, or their components.

It would be an advantage to have simpler, safer and faster data collection and transfer for VFDs. Therefore, there is a need for an improved system, apparatus and method for autonomous data collection from VFD.

BRIEF SUMMARY OF THE INVENTION

Embodiments described herein generally relate to autonomous data collection and transfer from variable frequency drives (VFD). A system, method and apparatus for autonomous data collection from VFDs is described.

An illustrative embodiment of a method for data collection from variable frequency drives (VFD) includes employing a drive data server in each of a plurality of VFD cabinets, each drive data server collecting operational data from an electric submersible pump (ESP) assembly in a downhole well by interfacing with a VFD system that controls the ESP assembly, storing the operational data so collected in a database file in the drive data server, transporting a mobile client within Wi-Fi range of each of the plurality of VFD cabinets, polling each drive data server by the mobile client, the polling of each drive data server triggered by the mobile client entering within the Wi-Fi range of the polled drive data server, transferring the database file from each drive data server to the mobile client using a first Wi-Fi connection, storing the database files in the mobile client, and moving the mobile client to within range of one of a second Wi-Fi connection or a wired network that permits access to a central receiving server at a processing location. In some embodiments, the method further includes transmitting the database files from the mobile client to the central receiving server using the one of the second Wi-Fi connection or the wired network, the transmitting triggered by the mobile client entering with range of the one of the second Wi-Fi connection or the wired network, and processing the operational data on the central receiving server. In certain embodiments, the method further includes using the processed operational data on the central receiving server to determine whether a fault has occurred during operation of the ESP assembly. In some embodiments, the operational data includes information regarding a temperature of an ESP motor in the ESP assembly over a period of three months. In certain embodiments, the operational data includes one of vibration in one axis, vibration in two axes, vibration in three axes, intake pressure, discharge pressure, gauge temperature, motor voltage, motor current per phase, or a combination thereof. In some embodiments, the method further includes overwriting the operational data in the database file once the database file is transferred from the drive data server to the mobile client. In some embodiments, storing the operational data on the drive data server further includes querying whether the operational data meets a delta, and the operational data is stored only if the delta is affirmatively met. In certain embodiments, the delta query is conducted one of every one second or every plurality of seconds, where the plurality of seconds is a minute or less. In some embodiments, the delta is a minimum value change of a variable measured from a most recent recorded value of same variable. In certain embodiments, transporting the mobile client within Wi-Fi range of each of the plurality of VFD cabinets includes driving a field truck including the mobile client. In some embodiments, the method further includes implementing a security access key matching protocol prior to transferring the database file from the drive data server to the mobile client.

An illustrative embodiment of a system for data collection from variable frequency drives (VFD) includes at least one drive data server, each of the at least one drive data server storing VFD operational data from an associated VFD system, each associated VFD system operationally coupled to a downhole electric submersible motor, a mobile client for transporting stored VFD operational data from the at least one drive data server to a central receiving server, the mobile client obtaining the VFD operational data from the at least one drive data server when the mobile client is within Wi-Fi range of the at least one drive data server, a storage medium in each of the mobile client and the at least one drive data server storing the VFD operational data and associating the VFD operational data with a particular VFD system of the associated VFD systems, a field truck transporting the mobile client proximate each associated VFD system and within Wi-Fi range of the at least one drive data server, and an autonomous software program installed on an embedded system in the mobile client and the drive data server, the software program of the mobile client obtaining the VFD operational data by polling the drive data server. In some embodiments, the VFD operational data stored on the storage medium of the drive data server includes data that meets a delta requirement. In certain embodiments, the drive data server polls the VFD system every five seconds to check for data that meets the delta requirement. In some embodiments, the VFD operational data includes one of vibration in one axis, vibration in two axes, vibration in three axes, intake pressure, discharge pressure, gauge temperature, motor voltage, motor temperature, motor current per phase, or a combination thereof. In certain embodiments, the VFD operational data is associated with GPS data of the at least one drive data server when stored. In some embodiments, each of the at least one drive data server and the mobile client comprise a galvanically isolated power supply board and an embedded computer system enclosed in a transportable case.

An illustrative embodiment of an apparatus for data collection from variable frequency drives (VFD) includes a power supply board accepting a range of input power voltages electrically coupled to a commercial-off-the-shelf embedded computer system, the embedded computer system informationally coupled to a data storage medium, a database stored on the data storage medium with read-write accessibility by the embedded computer system, a wireless network communication interface electrically coupled to the power supply board and informationally coupled to the embedded computer system, a GPS module electrically coupled to the power supply board and informationally coupled to the embedded computer system, and the embedded computer system and power supply board physically coupled to an enclosure including a transportable case. In some embodiments, the apparatus further includes an LCD electrically coupled to a power supply board and informationally coupled to the embedded computer system. In certain embodiments, the power supply board obtains power from one of a field truck or a VFD system and is galvanically isolated from electrical noise generated from an electric submersible pump assembly controlled by the VFD system. In some embodiments, the database includes operational data from an electric submersible pump assembly.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIG. 2A is a perspective view a VFD cabinet containing a VFD system of an illustrative embodiment with the door to the cabinet closed.

FIG. 4 is a schematic representation of a mobile client route between drive data servers of an illustrative embodiment.

FIG. 8 is schematic diagram of a drive data server database structure of an illustrative embodiment.

FIGS. 8A-8G are schematic diagrams refining the structure of the schematic diagram of the exemplary drive data server database of FIG. 8.

FIG. 9A is a schematic diagram key of the exemplary mobile client database structure of FIG. 9.

Figure 1:
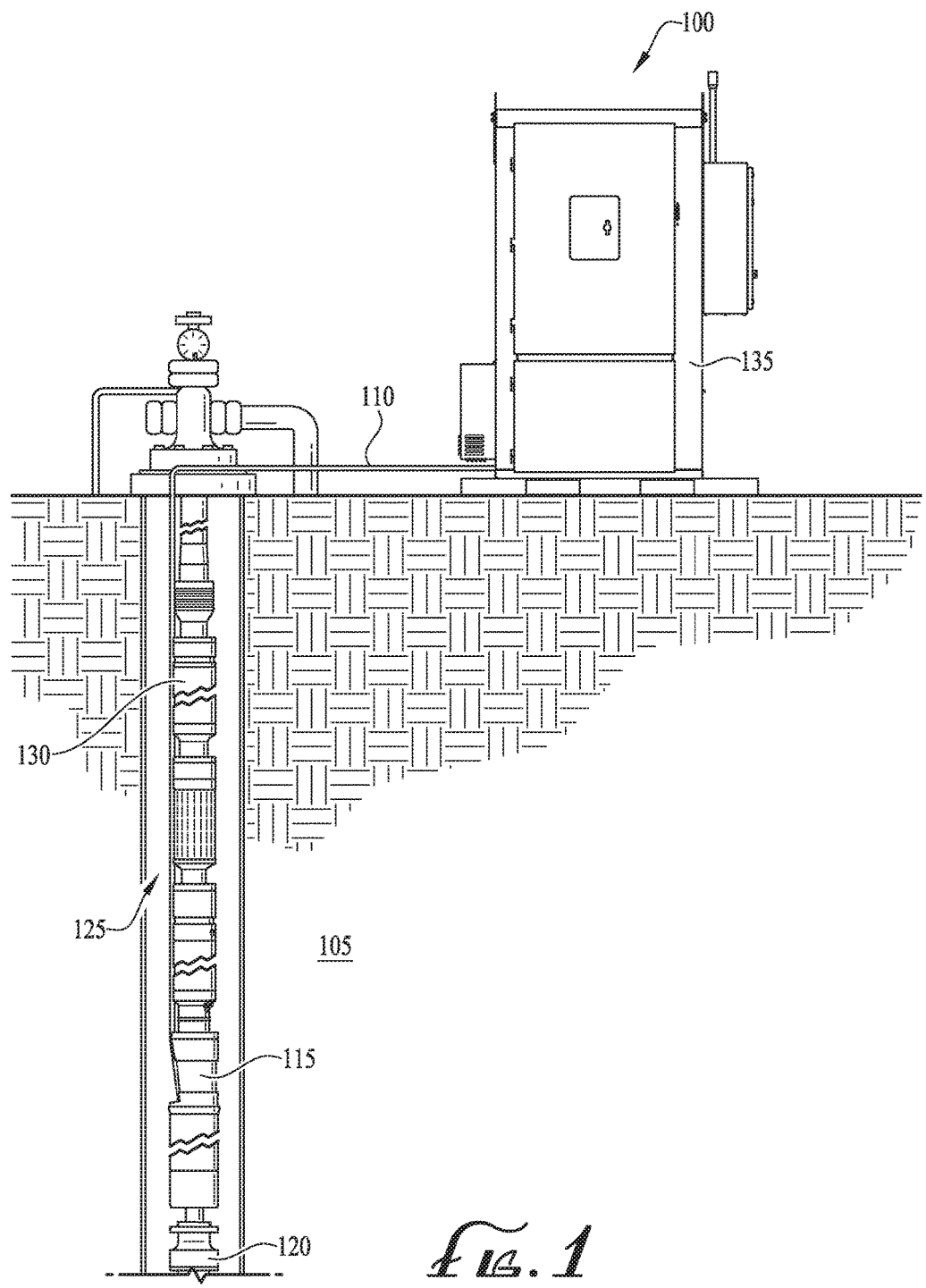
FIG. 1 is a perspective view of an electric submersible pump (ESP) assembly controlled by a variable frequency drive (VFD) system of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A system, method and apparatus for autonomous data collection from variable frequency drives (VFD) will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a "software program" includes one or more software programs.

As used in this specification and the appended claims, "coupled" refers to either a direct connection or an indirect connection (e.g., at least one intervening connection) between one or more objects or components. The phrase "directly attached" means a direct connection between objects or components.

As used in this specification and the appended claims, "drive data server" refers to an embodiment that collects data from a VFD system and/or its associated subsystems and stores that data until collected by a mobile client.

As used in this specification and the appended claims, "mobile client" refers to a mobile unit of one or more embodiments that autonomously interfaces to a drive data server when the mobile client comes within wireless range of the drive data server.

As used in this specification and the appended claims, "central receiving server" refers to a computer at a processing facility having a human interface and capable of accepting and storing data in a database.

As used in this specification and the appended claims, "Commercial Off the Shelf (COTS)" refers to the formal term "COTS" defined by U.S. Federal Acquisition Regulations for commercial items, including services, available in the commercial marketplace that may be bought and used under government contract, though the term as used herein is not so strictly limited.

As used herein, a "drive" referencing computer data storage such as with respect to a USB drive, is differentiated from the "drive" that refers to the electrical apparatus that provides voltage and current to an electrical motor and is also known to those of skill in the art as a "slice." A drive data server refers to the device that collects and stores operational and configuration data from the slice and/or its associated subsystems.

As used in this specification and the appended claims, "autonomous" refers to a system that performs its intended function without direct human intervention.

As used in this specification and the appended claims, "high-resolution operational data" refers to VFD data that has been collected at a rate on the order of less than one minute rather than on the order of multiple minutes. In illustrative embodiments, data may be collected every second, five seconds or every ten seconds.

As used in this specification and the appended claims, "delta" or "deltas" refer to one of several available techniques to reduce data storage amounts by recording only those data values that differ by more than a predetermined amount from prior recorded data, and not the full stream of real-time data available from the well equipment. The phrase "operational data" may mean both operational data and configuration data in some instances.

As used in this specification and the appended claims, "field truck" refers to a vehicle assigned to travel to well sites and to drive within a particular proximity of the well site. This term is not considered limited to a vehicle driven by a person; a robot or drone vehicle would also meet this definition.

As used in this specification and the appended claims, "Wi-Fi" refers to wireless fidelity network communication interface. The phrase "WiFi" or "wireless" means a radio connection between two compatible devices to transfer data. Other forms of radio communication or communication using other frequencies and used to accomplish data transfer are also included.

As used in this specification and the appended claims, "the data" or "VFD data" refers to all data gathered from a VFD system, including operational and configuration data from subsystems coupled to a VFD, such as, for example, a programmable logic controller (PLC), downhole gauge controller and/or interface and/or any Active Front End (AFE) that may be present. The phrase "the data" is intended to be broadly interpreted as all electronic information available at a well site and of interest to well operators. As used herein, the term "register" refers to the data returned by reading a specific Modbus register.

Illustrative embodiments of the invention provide a system, method and apparatus for autonomous data collection from VFDs that operate downhole submersible pumps. Illustrative embodiments may provide a system for autonomously collecting data from well equipment for uploading to a central receiving server. An exemplary system includes at least two embedded control systems, each built on a commercial platform, with customized components in transportable cases. A computer program with multiple instantiations may operate on the at least two embedded control systems to provide a client-server implementation of data collection and recording units. The units communicate by Wi-Fi autonomously when the client comes within range of the server. Units do not require any direct intervention by technicians to gather and store VFD system data. The client is a mobile unit installed in a field truck operated by a driver without the training to operate a VFD. When the mobile unit obtains a communications link to a central receiving server, the unit uploads its data for processing in a processing system.

Illustrative embodiments may process and analyze the data acquired for maintenance and operation of the production equipment. The mobile client and drive data server system of illustrative embodiments may provide a low-cost autonomous system that collects acquired data by wireless communication by proximity and without direct human intervention. Such embodiments allow employees without special training to collect data simply by driving a field truck containing the mobile client into the vicinity of the well equipment. Data may be collected and transferred in a format that provides detailed and relevant information regarding operation of particular downhole ESP equipment. The information may ensure that operational problems are seen by well operators, and the operators are able to make better choices and control the VFD more efficiently.

Illustrative embodiments provide a VFD data collection system that is internal to the VFD cabinet, and in some embodiments may be integrated with a VFD controller and/or replace the VFD controller that may include a PLC and user interface. Where a VFD controller is replaced by the VFD data collection system, the VFD data collection system may collect information directly from the drive, rather than from the VFD controller. Illustrative embodiments may operate on a dedicated, galvanically isolated power system that isolates the VFD data collection system from electrical noise generated by the ESP assembly. Illustrative embodiments may connect to a VFD's internal communication network, such as the communication network employed to transfer data from downhole gauges to the VFD controller.

Illustrative embodiments of a VFD data collection method may alter the delta threshold individually for every data register, leading to finer nuances of well operation. Rather than collecting the full stream of real-time data at ten-minute intervals, as is currently done by conventional VFD controllers, a system of illustrative embodiments may check data more frequently, such as every five-seconds or every one-second, and only record those data values that are attributed to be significant (that meet a specified delta). For example, only data that differs by more than a predetermined amount from the most recent previously-collected data may be collected, rather than recording the full stream of real-time data available from the well equipment. Alteration of the delta threshold on a per-register data value may refine the VFD control, and ultimately well control, by either narrowing or widening the delta on a per-register data value basis. The delta required to record information may vary by parameter. For example, if motor temperature data is being collected, data may only be stored if the temperature difference is at least 5° F. or 10° F. from the temperature data last-stored. If the new temperature has not changed by at least the designated amount, no new data will be recorded by the VFD data collection system of illustrative embodiments. In this way, less data need be stored, and the data that is stored is the most relevant data to well operation. For example, by selectively storing data as described herein, four days' worth of continuous data storage may be extended to six-months of storage. Illustrative embodiments may provide a longer lasting ESP pump, a more efficient well production and provide power savings. Data stored by a drive data server of illustrative embodiments may ensure that data is correctly associated with a particular ESP at a particular well and/or location.

The VFD data collection and transfer system of illustrative embodiments may include a drive data server (DDS) that first collects high resolution data from the VFD controller (PLC and user interface), and also a mobile client that collects the stored high resolution data from the DDS. The mobile client may be mounted in a transportation vehicle, such as a truck. High resolution data may be transferred from the DDS to the mobile client autonomously, the transfer initiated when the mobile client enters into Wi-Fi range of the drive data server. The mobile client may visit multiple drive data servers at distinct wells, and store data from each well with an associated GPS coordinate. The mobile client, with collected data, may transmit the collected data to a central server for review and/or processing. Once data is successfully transferred from the drive data server to the mobile client, and the mobile client confirms to the drive data server that a central server has successfully received the data, the data may be overwritten on the drive data server to reduce memory and processing space needed on the drive data server.

Illustrative embodiments may improve the operation of an ESP assembly by providing additional, pertinent information regarding downhole motor and pump conditions, and may also improve operation of the VFD system itself since settings and the database structure of the VFD system may be optimized based on the increase in relevant data obtained.

FIG. 1 illustrates a VFD system employing an ESP data collection apparatus of illustrative embodiments. As shown in FIG. 1, VFD system 100 may be at the surface of underground formation 105. VFD system 100 may be informationally coupled to ESP power cable 110 that, in addition to providing power to ESP motor 115, may also carry information from downhole gauges 120 (sensors) to VFD system 100. In some embodiments, information from downhole gauges 120 may be transmitted on a dedicated cable separate from ESP power cable 110. ESP assembly 125 may include ESP pump 130, which may for example be a multi-stage centrifugal pump that lifts oil, natural gas and/or water to the surface of underground formation 105 using stacked impeller and diffuser stages. Downhole gauge 120 may measure, for example, information such as motor rpm, discharge pressure, vibration in one, two, or three axes, intake pressure, discharge pressure, gauge temperature, and/or other variables. Pump flow rate may be inferred from differential pressures when a discharge pressure transducer is included. Motor voltages and power consumption may measured at the surface by the VFD system 100 and motor efficiencies may be calculated from the measurements obtained. Cabinet 135 may house VFD (main drive) 200 (shown in FIG. 2) and PLC 205 (shown in FIG. 2), which operates as the VFD controller. PLC 205 may be a VFD controller written in ladder-logic and include a user interface.

Figure 2B:
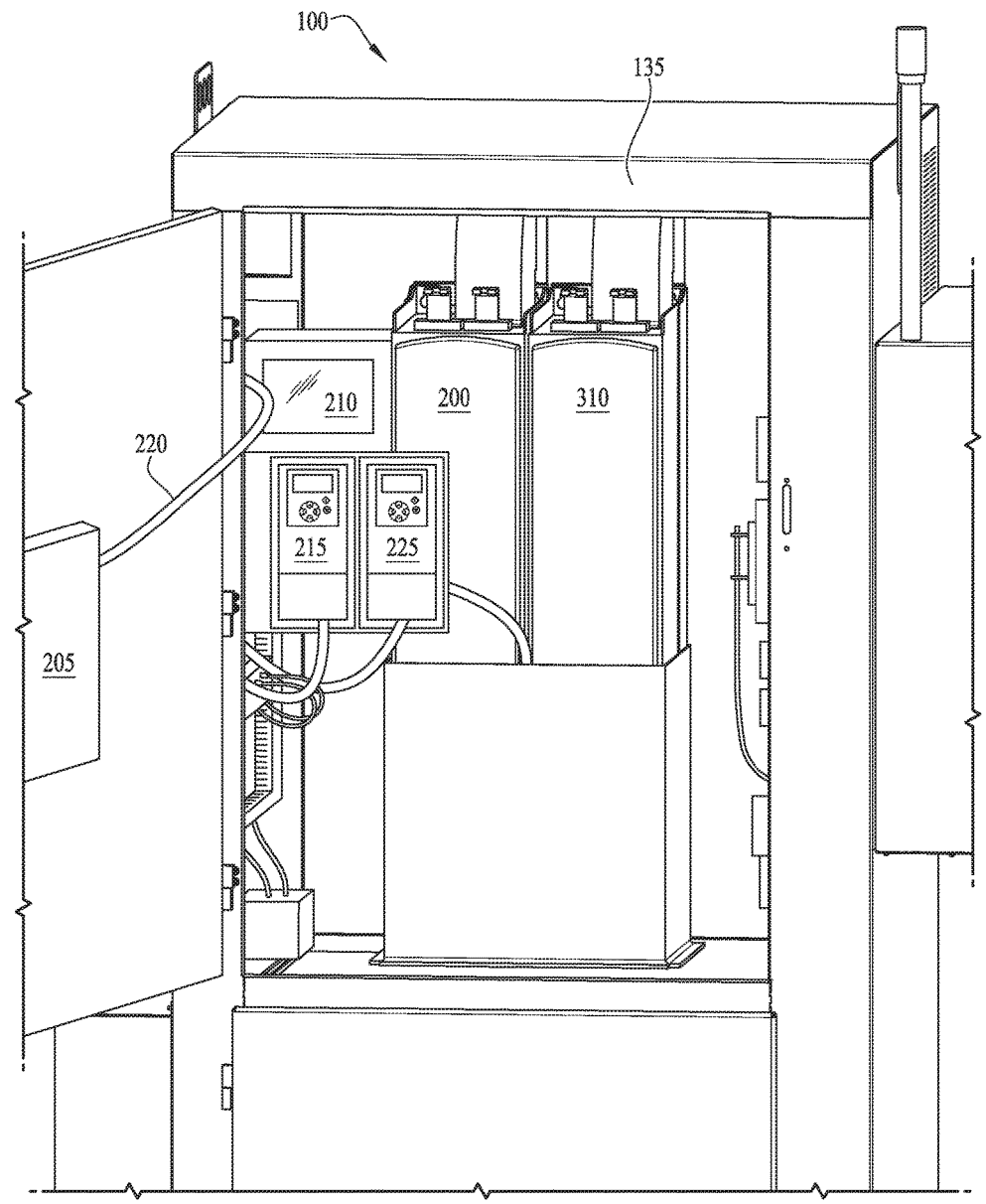
FIG. 2B is a perspective view a VFD cabinet containing a VFD system of an illustrative embodiment with the door to the cabinet open.

FIG. 2A and FIG. 2B illustrate VFD cabinet 135 of an illustrative embodiment. As shown in FIG. 2B, DDS 210 may be attached inside VFD cabinet 135 and informationally coupled to PLC 205, AFE 310 and/or VFD 200. VFD 200 may include slice panel interface 215 and AFE 310 may include AFE panel interface 225. Slice panel interface 215 and/or AFE panel interfaces 225 may provide lower-level configuration and control. PLC 205 may have network communications path 220 into VFD 200 to provide monitoring, command and control functions of the overall operation of VFD 200 at a high level. PLC 205 may include a graphical user interface that is accessible from the outside of cabinet 135 when the door to cabinet 135 is closed. FIG. 2A illustrates the graphical user interface of PLC 205, accessible from outside cabinet 135.

Figure 3:
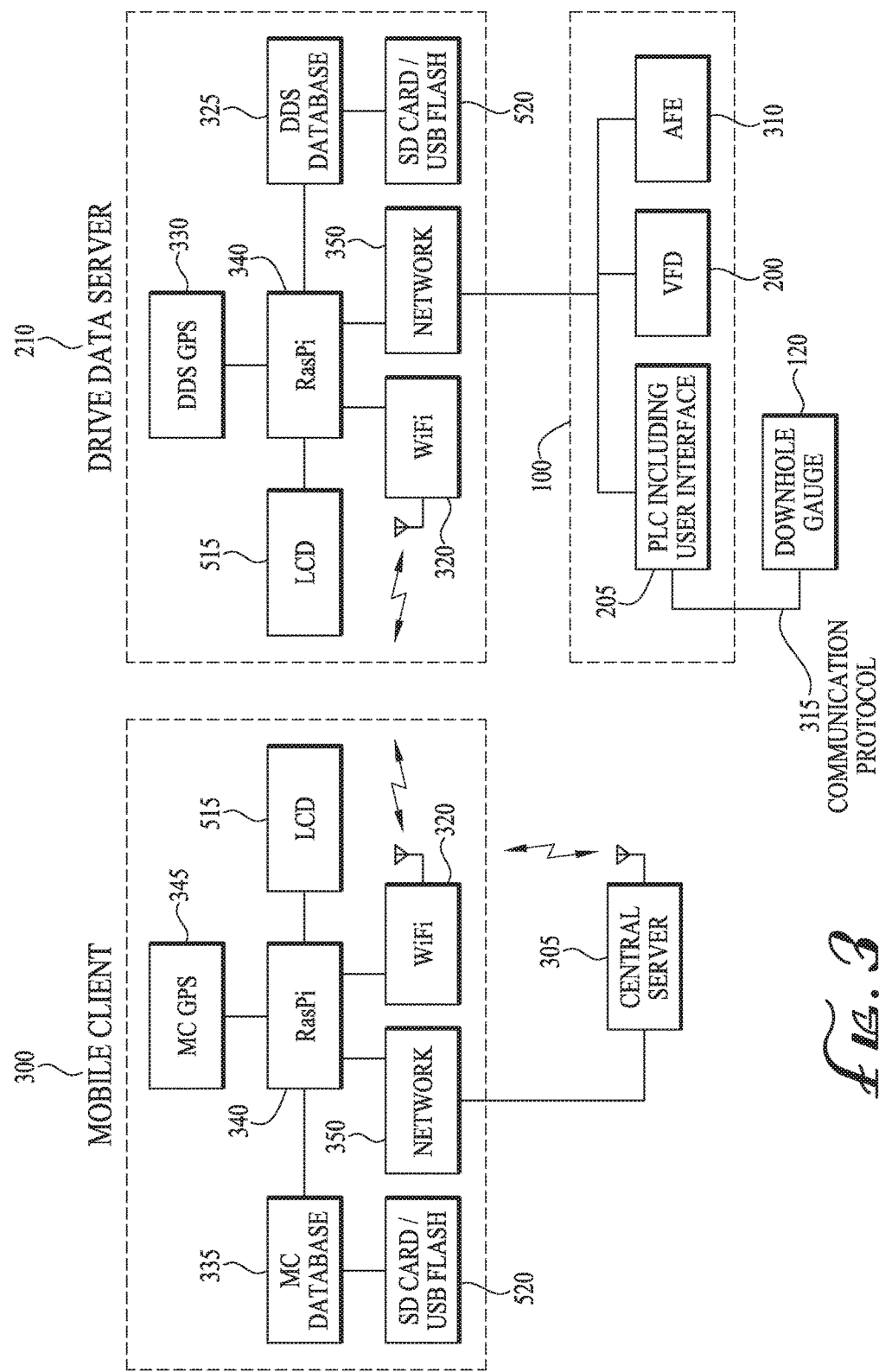
FIG. 3 is a schematic diagram of a data collection system of an illustrative embodiment.

FIG. 3 illustrates a VFD data collection and transfer system of illustrative embodiments. Illustrative embodiments may provide a single mobile client 300 with multiple alternative configurations to collect, process, reduce and transfer data acquired from VFD systems 100 located at various well sites and/or production fields 400 (shown in FIG. 4) to central receiving server 305 for additional processing. VFD system 100 may include PLC 205, which may be a programmable logic controller written in ladder logic and include a user interface, VFD 200 (slice or drive) and active front end (AFE) 310, which together may reside at the surface of the well and form VFD system 100 located within cabinet 135. AFE 310 may be incorporated into and/or coupled to PLC 205, and may be a converter that draws current sinusoidally to assist in reducing harmonics. In some embodiments, AFE 310 may include silicon carbide power devices.

Downhole gauge 120 may acquire data from downhole and communicate the information to PLC 205 through communication protocol 315 and/or a gauge controller that may interface between downhole gauge 120 and the user interface of PLC 205. The gauge controller may interpret the signals from downhole gauge 120. Communication protocol 315 maybe a Modbus serial communications protocol for transmitting information over serial lines between downhole gauge 120 and PLC 205, for example Modbus RS-485. Configurations of the various embodiments may cause one or more DDS 210 to function as a direct data collector for VFD system 100. VFD 200 may be the source of measurements taken of voltages and currents supplied to ESP assembly 125. ESP assembly 125 data may be provided to VFD system 100 via PLC 205, the user interface of PLC 205 and/or a gauge controller. The downhole gauge 120 surface controller may exist as one of several different device types that provides a signal interface to downhole gauge 120 and also as a unit that provides the data values interpreted from those gauge signals. Illustrative embodiments may also provide alternative configurations of mobile client 300 that may cause mobile client 300 to function as a data aggregator for acquiring data files from one or more DDS 210 data collectors and to transport that data to central receiving server 305.

As data is acquired by PLC 205, drive data server 210 may inquire at intervals of every second or every few seconds to see if the relevant data meets a predetermined delta. If the data acquired by PLC 205 meets the predefined delta, DDS 210 will store the particular data that meets the predetermined delta. If the delta is not met, DDS 210 will not store the particular data. In this way, only relevant data may be stored and later transferred for analysis, which may increase the relevancy of information obtained and decrease the quantity of information that is stored by pre-filtering the data. In some embodiments, data may be stored by DDS 210 without first meeting a delta. For example, use of a delta may be optional to a well operator, who may determine whether some, all or no data types may be subject to a delta inquiry. If a delta inquiry is not employed for a particular data type, then DDS 210 may download all data of such particular data type. In one exemplary embodiment, DDS 210 may include 4.0 GB of storage.

Illustrative embodiments may provide for each of mobile client 300 and/or DDS 210 to be constructed of a commercial off-the-shelf (COTS) processor interfaced to a custom power supply board in an enclosed transportable case. DDS may connect to VFD system 100 by Modbus TCP using Ethernet, serial link, or other network 350 interface known to those of skill in the art. Mobile client 300 may communicate with DDS 210, and/or central receiving server 305 by wireless communication (Wi-Fi) 320 or by network communication 350.

Illustrative embodiments of the system may include two embedded system computers, one for each of mobile client 300 and drive data server 210. Both computer systems may be differentiated by applications configured therein. The first computer, the drive data server (DDS) 210, may be mounted within cabinet 135 of VFD system 100 and collects operational, configuration, and log data ("the data") from VFD 200 and other well equipment via network 350. Network 350 may be implemented as an RS-485 network, such as for example, Modbus RS-485 or Modbus TCP using Ethernet. DDS 210 may be fixedly mounted using magnets to the interior or exterior of cabinet 135 of VFD system 100, or placed in some other configuration that allows connecting DDS 210 via network 350. In certain embodiments, DDS 210 may be integral to PLC 205. Communication protocol 315 may be either RS-232 or RS-485 and used to query the downhole gauge data (pressure, temperature, vibration). VFD 200 data and AFE 310 data may be acquired via network communication 350 via Modbus TCP.

The second computer, Mobile Client (MC) 300 may be mounted in field service vehicle 405, shown in FIG. 4. As illustrated in FIG. 4, field service vehicle 405 travels to one or more oil production fields 400, where each oil production field 400 may include one or more VFD systems 100, each VFD system associated with a distinct ESP assembly 125 lifting fluids from underground formation 105. Field service vehicle 405 may have a regularly scheduled travel route, for example a route conducted every week or every three-months. When field service vehicle 405 with MC 300 onboard comes within Wi-Fi 320 range of each DDS 210, MC 300 may poll DDS 210 to retrieve the data collected by DDS 210 from PLC 205, VFD 200 and/or downhole gauge 120. Mobile client 300 may eliminate the need for a skilled field technician to manually download data. Instead, only a driver is needed to operate field service vehicle 405 and trigger autonomous download of data to mobile client 300 by approaching within Wi-Fi 320 range of DDS 210.

DDS 210 and MC 300 may communicate using Wi-Fi 320 and securely transfer database files collected by DDS 210 to MC 300. Illustrative embodiments may include wireless communications between a MC 300 and a DDS 210. MC 300 may carry the database files to a wireless access point to securely transfer the database files via Wi-Fi 320 or by network 350 connection to central receiving server 305. At central receiving server 305, the database files may be processed and made available for later review and detailed analysis. Both MC 300 and DDS 210 may each be implemented on an embedded system controller. DDS 210 may collect and retrieve ESP drive configuration data and high-resolution operational data from PLC 205 and transfer that information to MC 300. MC 300 may transfer the information to central receiving server 305 at a processing facility. The VFD systems 100 may be installed at one or more oil production fields 400.

It is an advantage of illustrative embodiments that high-resolution data acquired from PLC 205 may be available to reconstruct a complete operational history of VFD 200 and any other attached equipment such as ESP assembly 125. This high-resolution data—collected more frequently (e.g., every five seconds as opposed to every ten minutes) but also more selectively (only data that meets delta requirements)

than conventional systems—may be received and processed at central receiving server 305 sooner than in the past due to the advantages of illustrative embodiments. Lower resolution data may also be available for processing, but may not be complete and may be significantly delayed. This rapid presentation and analysis of the well performance and VFD operational data collected by the invention may be instrumental in gaining opportunities to perform preventive maintenance and improve production revenue.

MC 300 may be one-half of the data collection, data communication, and data transfer chain of illustrative embodiments. The other half may be DDS 210. DDS 210 may periodically poll the subsystems of VFD system 100 in intervals such as every one-second, two-seconds, five-seconds or ten-seconds. DDS 210 may then record the configuration, operational and event data into DDS database 325, but only if the polled data meets delta requirements if that option has been selected. If the delta inquiry has been employed with respect to a particular data set, and polled data does not meet the delta, the polled data is not stored by DDS 210. DDS database 325 may be implemented, for example, as a SQLite database, though illustrative embodiments are not so limited. MC 300 may autonomously transfer the DDS database 325 files from DDS 210 to MC 300 when MC 300 comes into Wi-Fi 320 range. Specifically, the file transfer may be triggered by MC 300 entering into Wi-Fi 320 range of DDS 210. DDS GPS 330 data associated with polled data may be stored in DDS database 325 to ensure that data is associated with the proper ESP assembly 125, underground formation 105 VFD system 100 and/or motor 115.

MC 300 may transport DDS database 325 files to a wireless access point and then may transfer them to central receiving server 305 using Wi-Fi link 320 or other communication method such as the Internet or a direct network connection. In illustrative embodiments, Wi-Fi link 320 provides a two-fold advantage for data transmission. First, Wi-Fi link 320 may provide advantages of an acceptable data transmission speed when within a minimum distance from DDS 210 at the oil production field 400. It may also provide the same speed and distance benefits when transferring MC database 335 files to the central receiving server 305 at a processing facility.

Hardware Considerations

Both embedded systems of mobile client 300 and drive data server 210 may be a Raspberry Pi 2 (RasPi) 340 running a standard version of the Raspbian Operating System (OS). While one or more embodiments herein are described in terms of the Raspberry Pi 2, the invention may be implemented on any equally comparable platform, including later revisions of the Raspberry Pi 340, for example. The invention is not limited to the Raspberry Pi 340 platform.

Figure 5A:
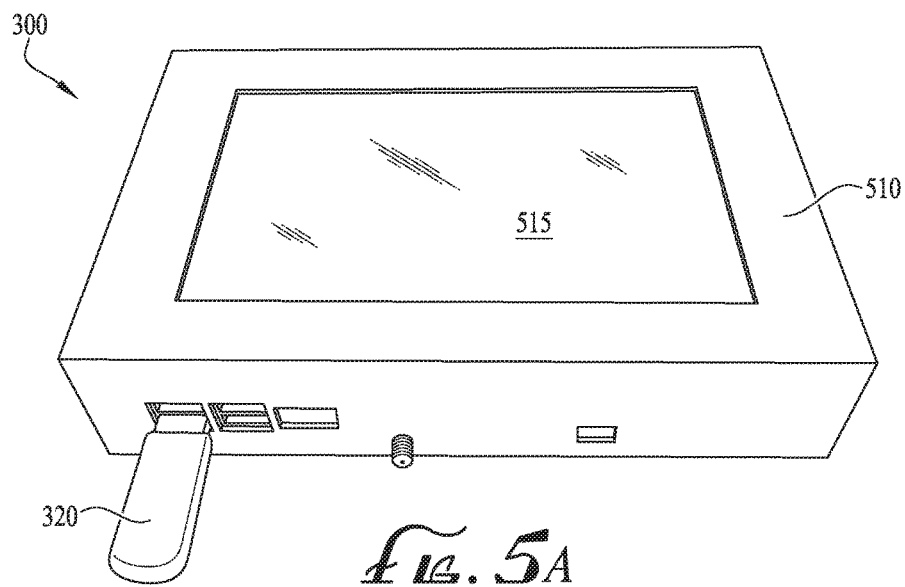
FIG. 5A is a perspective view a mobile client of an illustrative embodiment.
Figure 5B:
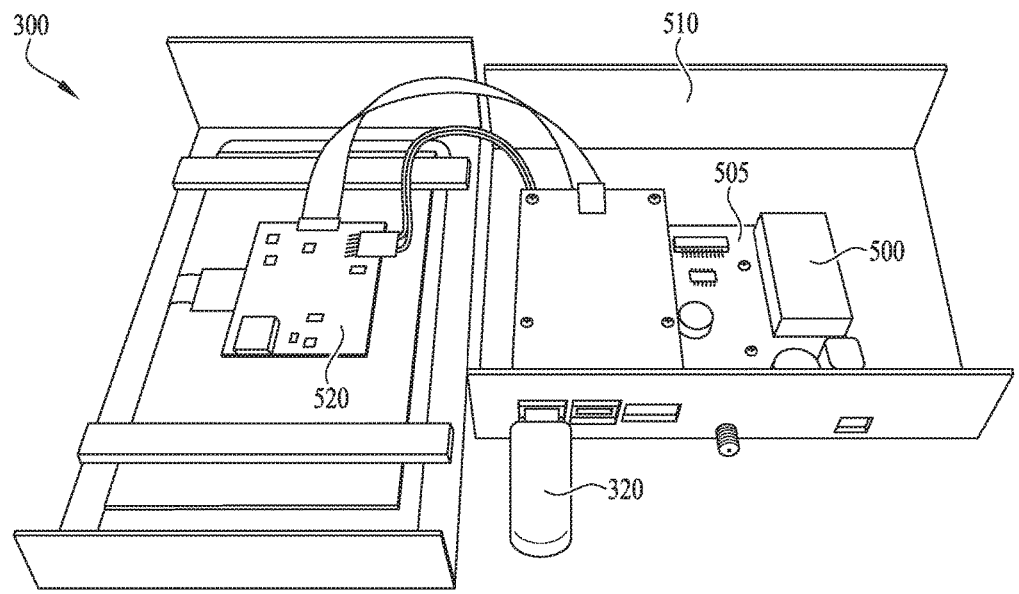
FIG. 5B is a perspective view of a mobile client of an illustrative embodiment.

As shown in FIG. 5A and FIG. 5B, the MC 300 and the DDS 210 may contain a power supply 500 and interface board 505 that allows the embedded systems to operate from either +12 VDC or +24 VDC. FIG. 5A and FIG. 5B illustrate MC 300, but the hardware for MC 300 and DDS 210 may be similar or identical. Supporting a +12 VDC power source for mobile client 300 allows mobile client 300 to be powered from field truck 405. Supporting a +24 VDC power source for drive data server 210 allows drive data server 210 to be powered from VFD system 100. Galvanic isolation provided by the power supply 500 may help to eliminate electrical noise generated by the VFD 200. The devices may be housed in an enclosure (transportable case) 510 designed specifically for mobile client 300 and DDS 210. In one or more embodiments, liquid crystal display (LCD) 515 on one or both of mobile client 300 and DDS 210 may be used to provide status information related to the respective system's operational progress. In preferred embodiments, mobile client 300 and DDS 210 may accomplish their functions without any user interaction beyond initial system configuration.

MicroSD card 520, USB flash drive, or other compatible storage medium may be used as a data storage medium for the embedded systems. In some embodiments, MicroSD card 520 may be partitioned into at least three partitions. The Raspbian Operating System (OS) and the application may reside in a read-only partition to reduce the possibility of MicroSD card 520 corruption that might prevent the system or application from running. Acquired data may be stored on the same MicroSD card 520 in a separate, write-enabled partition.

In one or more embodiments, MC 300 and DDS 210 functions of illustrative embodiments may be created as a single computer program with execution governed by configuration parameters. In other embodiments, separate programs may be used to implement the functions. For simplicity, this description will assume the single program approach, but the invention is not so limited. The embedded systems and apparatus that the MC 300 and DDS 210 functions may also run on identical, similar or completely different components. For example, MC 300 may contain MC GPS module 345 to provide position awareness to identify its proximity to oil production field well sites 400. This information may not be required in all embodiments to perform DDS 210 functions, and so may be omitted from that configuration to save cost. The position information from MC GPS module 345 may trigger the system to initiate Wi-Fi 320 connection negotiation and file transfer process.

The Mobile Client Function

FIG. 4 is a graphic representation of the use of an exemplary embodiment. MC 300 function is one-half of the data collection, data communication, and data transfer chain of illustrative embodiments. The other half is DDS 210. DDS 210 unit periodically polls the subsystems in VFD system 100 and records the operational data and event data into one or more database files 325 on MicroSD card 520. MC 300 may be mounted into field truck 405. Field truck 405 may be driven to oil production field well sites 400. As field truck 400 approaches within Wi-Fi 320 range of VFD systems 100 at well sites 400, MC 300 may initiate transfer of those DDS database files 325 from each DDS 210 to MC database files 335 shown in FIG. 9.

Exemplary Operation

Figure 6:
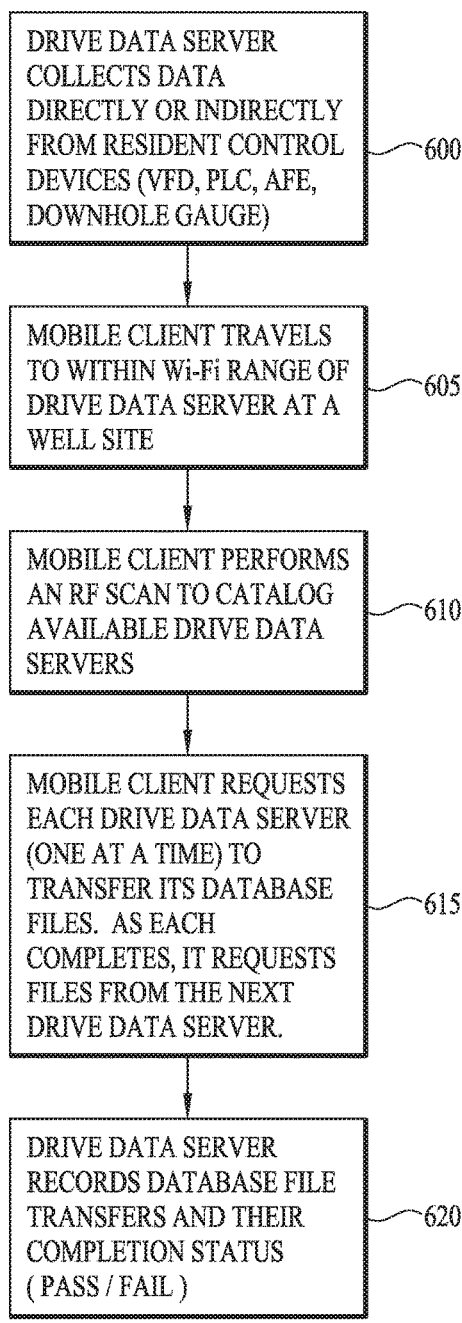
FIG. 6 is flowchart of a method of collecting data of an illustrative embodiment.

FIG. 6 is flow chart of a method of data collection of an exemplary embodiment. At DDS collection step 600, Drive Data Server 210 may collect data from one or more of the resident devices (VFD 200, PLC 205, AFE 310 and/or downhole gauge 120) either directly through network 350 or indirectly through communication protocol 315, such as Modbus RS-485. Data may be polled at intervals less than a minute and, if the delta option is selected, collected only if deltas requirements are met. The collected data may be stored in database DDS database 325.

At MC collection step 605, Mobile Client 300 may travel to different oil production fields 405 collecting DDS database files 325 from each DDS 210. Once collected, MC 300 will store the data in MC database 335 and carry that data back to transfer to central receiving server 305.

At cataloging step 610, MC 300 arrives at production field 400 and may perform an RF scan to catalog the available DDS 210 units. At data transfer step 615, MC 300 requests each DDS 210 to transfer its configuration data and database file summary information. At data transfer step 615, MC 300 may request one of DDS 210 to transfer its DDS database files 325. MC 300 may successfully complete the DDS database file transfer 325 to MC database 335 and may select another DDS 210 to transfer its associated DDS database files 325. This process continues until all DDS 210 units transfer their DDS database files 325 to MC database 335 of MC 300. DDS 210 may recognize and queue for a later retry any interrupted or incomplete database file transfers.

At status confirmation step 620, DDS 210 may record database file transfers and their completion status as a pass or fail. MC 300 may first confirm that MC database files 335 and/or DDS database files 325 have been successfully received by central receiving server 305 before communicating success to DDS 210. Once DDS 210 successfully transfers files to MC 300 and MC 300 confirms to DDS 210 that central receiving server 305 has successfully received the files, DDS 210 may overwrite old data to reduce storage and processing requirements. MC 300 may travel along its data collection and transfer route on a schedule, such as daily, weekly, bi-monthly or quarterly while a particular well is operating.

Software Functional Decomposition

Autonomous operation may be performed by both MC 300 and DDS 210. System operations such as data collection, data storage, network communication, data transfers, and configuration updates may be autonomous which require no user interaction to complete. There may not be any front panel switches to permit interaction with field personnel.

Boot process may be performed on both MC 300 and DDS 210. The boot process may be modified so processes necessary to support the functions specific to the controller may run without user intervention and significant system faults trigger automatic system restarts.

Status monitoring/watchdog may be performed on both MC 300 and DDS 210. The system may supervise its own operation and report progress of automated operations via a front panel LCD 515, shown in FIG. 5A. This status information may be necessary to provide an indication of successful progress of automated processes.

Event logging may be performed on both MC 300 and DDS 210. Non-critical events and operational status information may be logged in the event database 810.

Error recovery and reporting may be performed on both MC 300 and DDS 210. The system may recognize fault events and record these events in DDS database 325 and/or MC database 335.

Display management may be performed on both MC 300 and DDS 210. The system may provide status information to field personnel via front panel LCD 515.

File transfer may be performed on both MC 300 and DDS 210. File transfers into and out of the system may require initiation, data transfer maintenance and verification of successful transfer completion.

Database management may be performed on both MC 300 and DDS 210. Database 325 and 335 file sizes may be limited to reasonable lengths (<50 MB) by a file rotation process. A recovery process may gracefully recover from file and data record corruptions due to unannounced power losses and interrupted file transfers.

Network 350 communications may be performed on both MC 300 and DDS 210. Basic TCP/IP network communications protocols such as SSH, SCP, and SFTP, known to those of skill in the art, may be available to provide support for higher-level features and functionalities.

Serial communications may be performed on both MC 300 and DDS 210. Basic serial communications in multiple protocols, such as for example Inter-Integrated Circuit (I2C), Serial Peripheral Interface (SPI) bus, and Universal Asynchronous Receiver/Transmitter (UART) may be available to provide support for higher-level features and functionalities.

Security may be performed on both MC 300 and DDS 210. Basic security features may be implemented to prevent unauthorized access, as more specifically discussed herein in connection with FIG. 7.

Data Collection may be performed on DSS 210. DSS 210 may collect data from connected peripherals such as PLC 205, VFD 200, AFE 310 and/or downhole gauge 120 and format this data for storage in DDS database 325.

Database creation may be performed on DDS 210. Database creation may create DDS database 325 files with proper internal structures into which data and events are stored. FIG. 8 and FIGS. 8A-8G illustrate a tree diagram of an exemplary DDS database 325 organizational structure. The structure of DDS database 325 may improve information storage by DDS 210 by selectively storing information most pertinent to faults and relating that information to data regarding particular ESP assemblies 125 and/or VFD systems 100. As shown in FIG. 8, DDS database 325 may be organized as main level categories identification information 800, device information 805, events 810, data 815, configuration 820 and users 825.

Figure 8A:
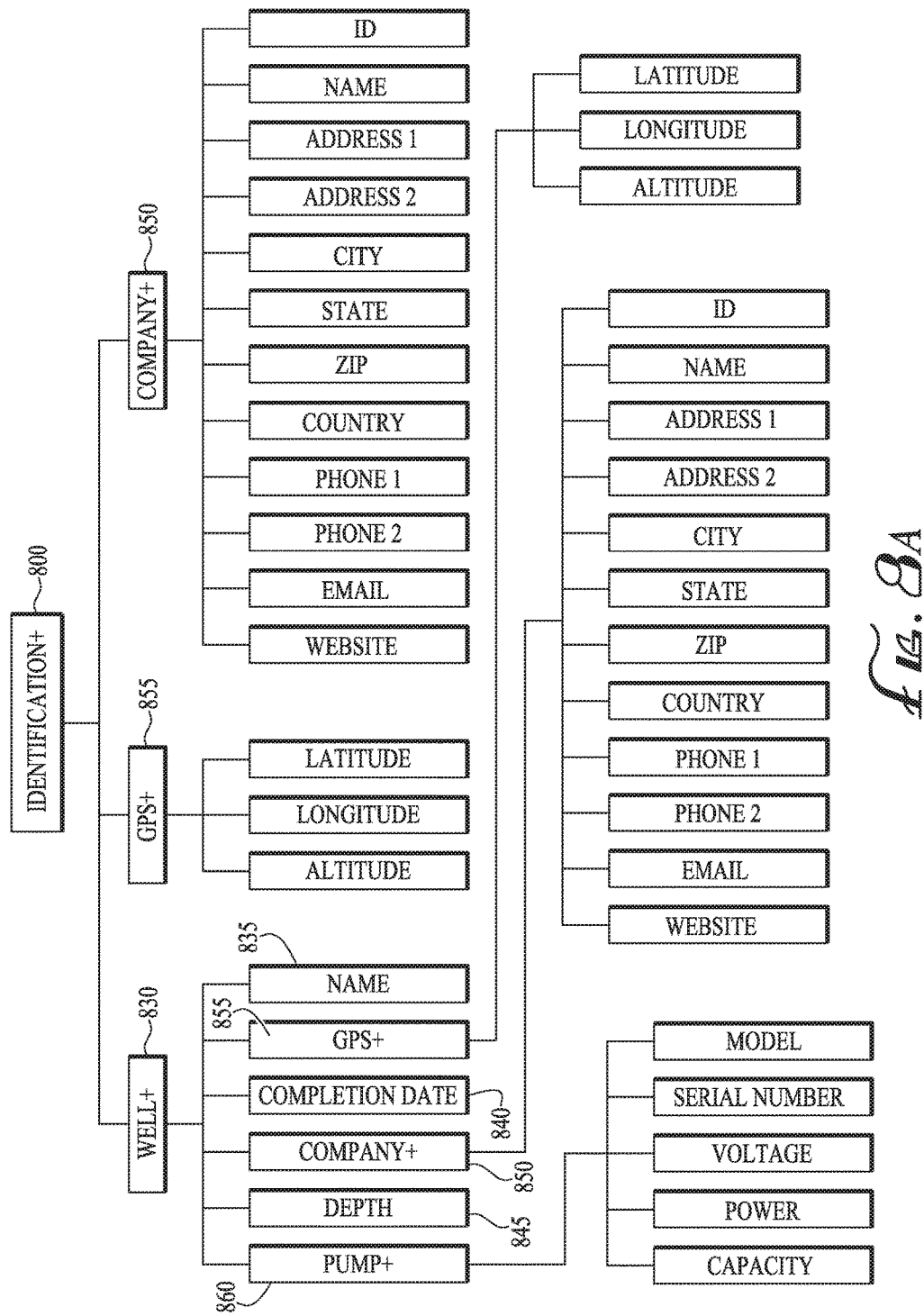

FIG. 8A further refines the structure of identification information 800 storage. Identification information 800 may include data such as well information 830, GPS information 855 and Owner information 850. Well information 830 may comprise well name 835, well completion date 840, well depth 845, owner name 850, GPS location 855 and pump information 860. Pump information 860 may branch into model, serial number, voltage, power and capacity of pump 130 and/or motor 115. GPS location 855 may comprise latitude, longitude and altitude of the particular well 105. In the example of FIG. 8A, GPS information 855 is included in both identification information 800 and also well information 830. Similarly, owner information 850 is included in both identification information 800 and well information 830. In this manner, ESP assembly 125 particulars may be related to relevant data for the associated ESP assembly 125, underground formation 105 and/or VFD system 100.

Figure 8B:
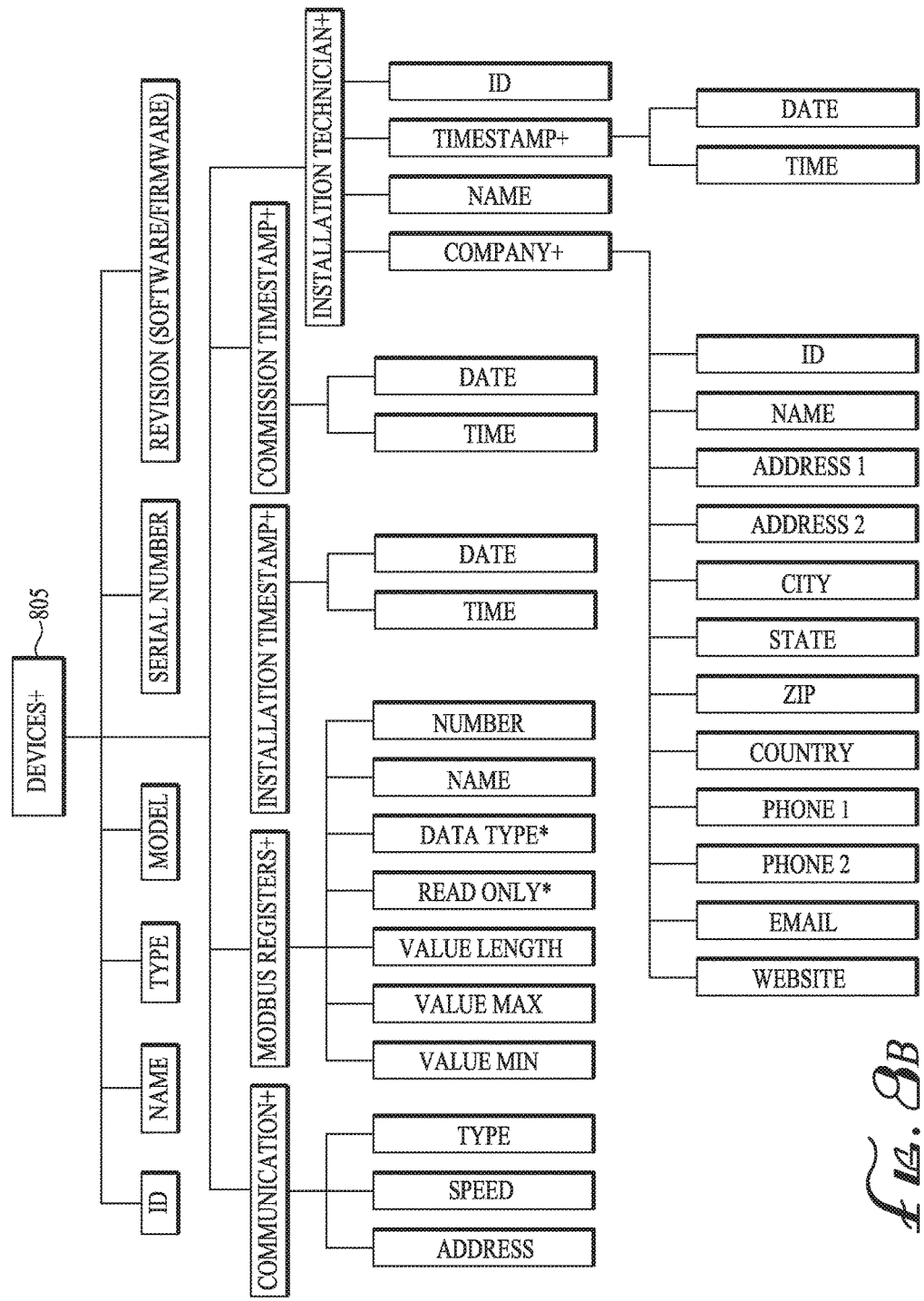
Figure 8C:
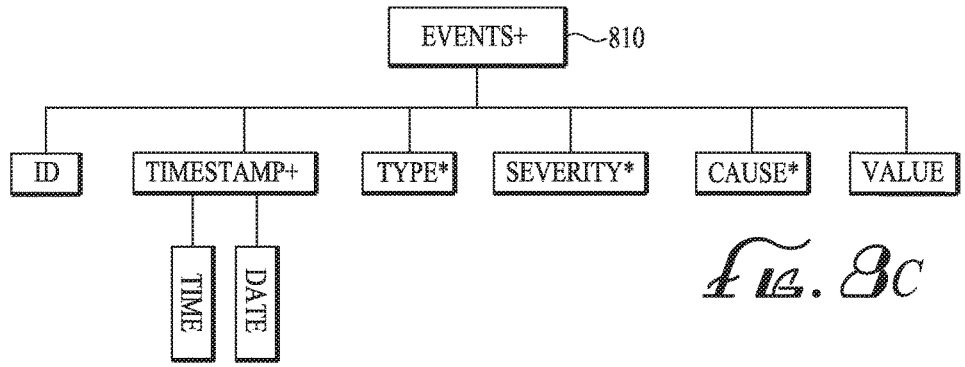
Figure 8D:
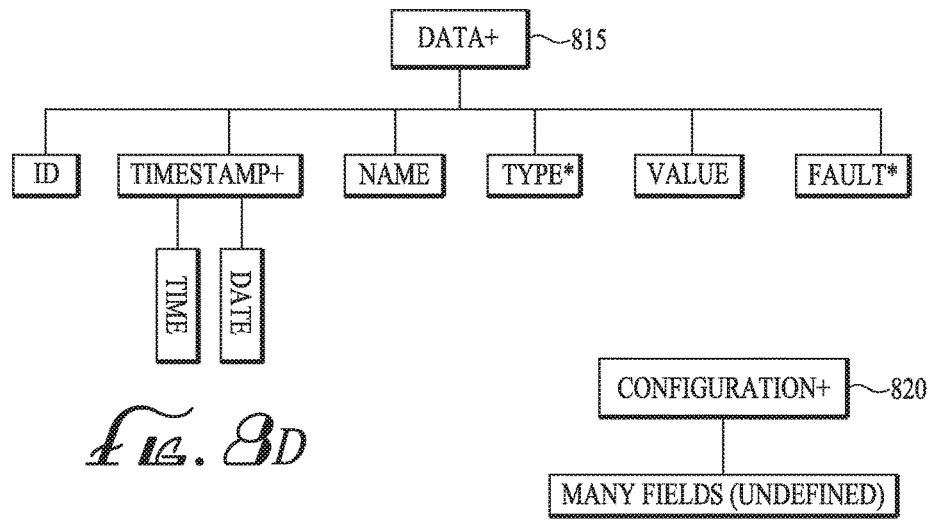
Figure 8E:
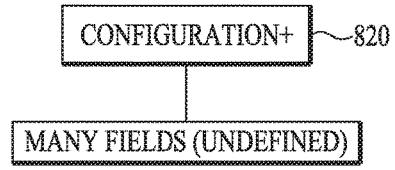
Figure 8F:
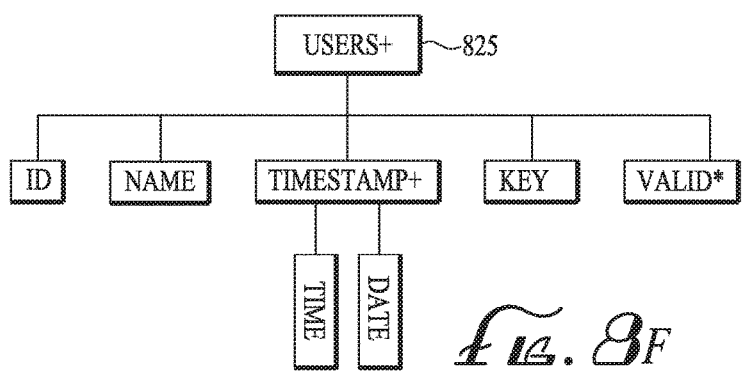

FIG. 8B further illustrates an exemplary organization of the structure of device information (805) which may include MODBUS register information. FIG. 8C illustrates elements of event information 810. Event information 810 may include the type, severity, cause, value and timestamp for each event. FIG. 8D shows an organization for data information 815. Data information 815 may include the type, value, fault and timestamp. A fault may be represented as a simple true/false value. FIG. 8E shows a schematic representation of configuration information 820, which may contain many fields. FIG. 8F illustrates user information 825 data, which may include information about whether a user ID is valid. FIG. 8G provides a reference key for the enumerated elements of FIG. 8 and FIGS. 8A-8F.

Figure 9:
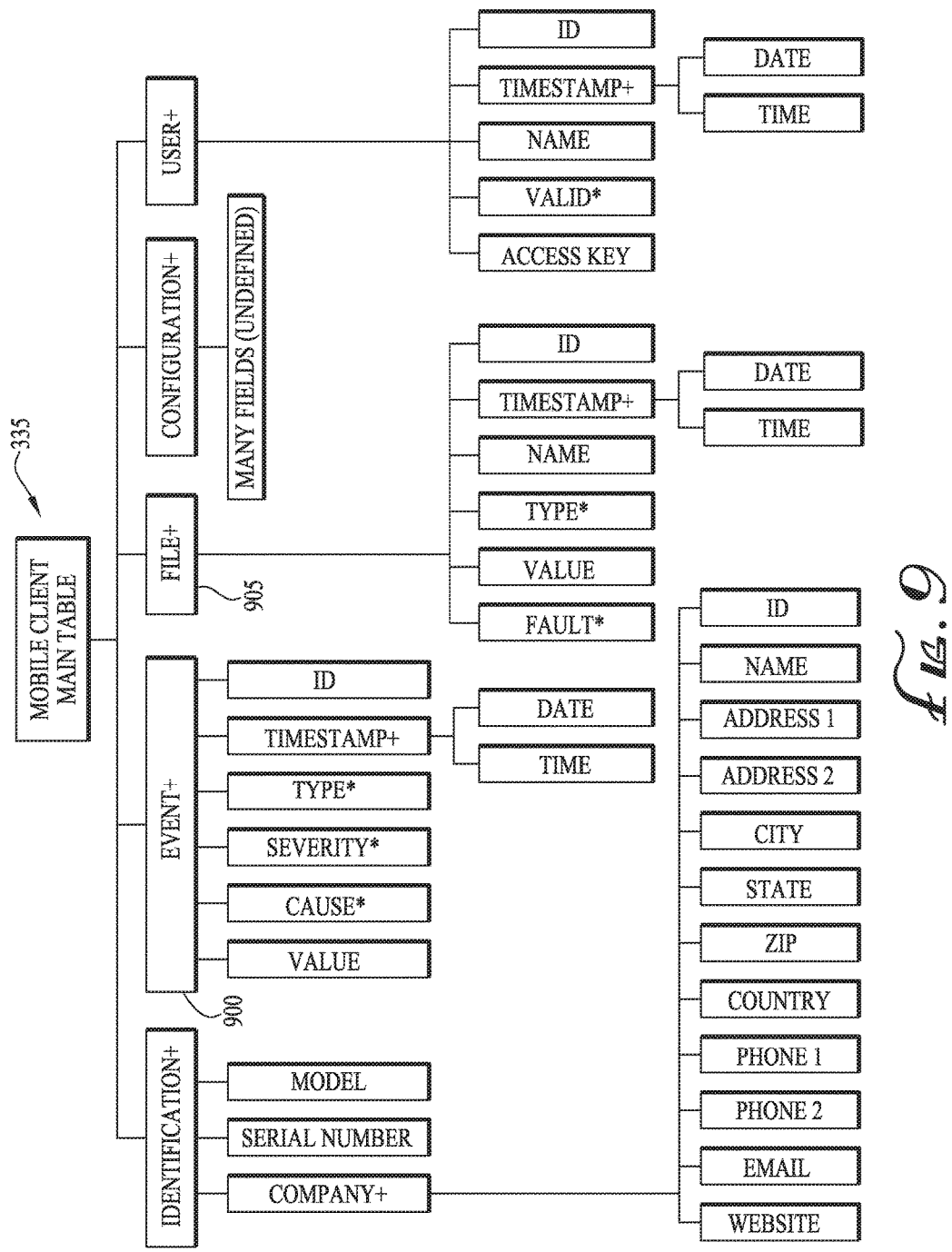
FIG. 9 is a schematic diagram of a mobile client database structure of an illustrative embodiment.

File name management may be performed on DDS 210. File name management may create ESP drive data files and event files so that they are uniquely identified with human-readable identifiers. This may facilitate the process of determining the correct origin of each database file. FIG. 9 illustrates exemplary MC database 335 structure including MC events 900, which may compile event information 810 from each DDS 210, and file information 905 which may include data information 815 from DDS 210. FIG. 9A provides a reference key for the enumerated elements of FIG. 9.

Peripheral device management (configuration) may be performed on DDS 210. Peripheral device management may recognize peripherals connected to DDS 210. Fault events may be logged for those peripherals that subsequently fail to respond to valid data requests (MIAs).

Modbus map management may be performed on MC 300. Modbus map management may contain lists of Modbus registers assigned to various peripheral devices that may be connected to the system. Changes to these Modbus maps may be configurable by MC 300.

Configuration management may be performed on DDS 210. Configuration management may allow changes to its configuration and begin using an updated configuration upon receiving the proper commands from MC 300. Each DDS 210 may have a customized set of configuration parameters. MC 300 may handle configuration file updates for itself as well as those configuration updates for an individual DDS 210.

VFD 200 identification management may be performed on MC 300 to uniquely relate ESP slice 200 equipment, location, well name, and TCP/IP addressing assigned to the ESP slice system 100 as well as the data and events retrieved from the VFD slice system 100.

Data scrubbing may be performed on MC 300. Data scrubbing may handle data conversion from data stored in DDS database 325 and/or MC database 335 to single records in a Java Script Object Notation (JSON) format for transfer into central receiving server 305.

MC 300 may transfer data into central receiving server 305. Data record transfers may be negotiated from MC 300 and into central receiving server 305 via wired or wireless communications. Central receiving server 305 may aggregate data from multiple DDS 210 for processing and analysis.

System Communication Security

Figure 7:
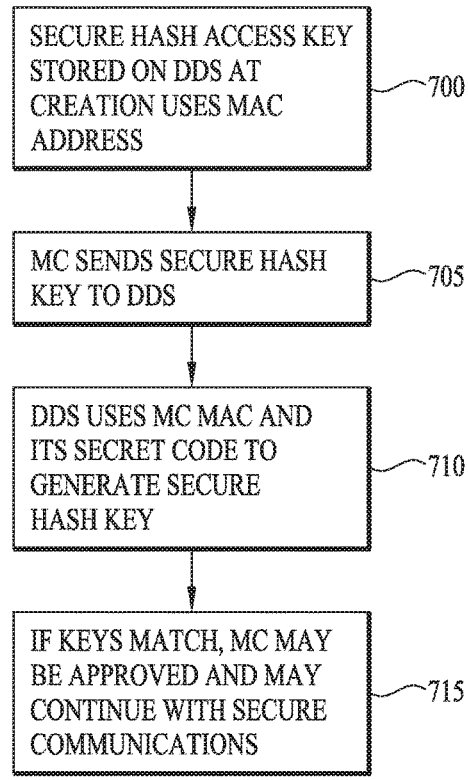
FIG. 7 is a flowchart of a security access key method of an illustrative embodiment.

FIG. 7 is a flowchart of a process for creating a security access key in one or more illustrative embodiments.

At MC secure hash storage step 700, MC 300 may have a file containing a secure hash, such as an MD5 sum, that is generated when the system is built. The secure hash may be used as an access key into one or more DDS 210. The secure hash may be created by a combination of the wireless MAC address and some piece of constant data (a number or a text string) that is stored on DDS 210 and that is common among all DDS 210.

At secure hash transfer step 705, when MC 300 negotiates a connection with DDS 210, MC 300 may pass the file containing the secure hash to DDS 210. At DDS secure hash generation step 710, DDS 210 uses MC 300 MAC address along with the secret constant to produce a secure hash of its own. At secure hash matching step 715, if the two secure hashes match, MC 300 communication with DDS 210 may be authorized and continue with secure communications.

This security access method may prevent an unauthorized MicroSD card 520 from being used to access DDS 210. It is another layer of protection to prevent unauthorized access to any ESP drive 200 data.

A replacement MicroSD card 520 may contain the necessary file used to generate the secure hash as part of its initialization. The program that creates the secure hash may optionally be erased as the final step in creating the secure hash sum. This allows stocking a single MicroSD card 520 image.

Secure access procedures such as these are intended to increase the difficulty of a casual attempt to gain access to the ESP slice 200. It is a simple, adaptable method that has a low hurdle to implement, very low impact on the application, and increases system security dramatically.

Illustrative embodiments significantly improve operation of downhole ESP assembly 125 and/or its associated VFD system 100, by providing increased longevity of the downhole equipment and better production from underground formation 105. In one example ESP pump 130 may encounter a large gas slug that causes pump 130 to run dry. The duration of the gas slug may last for five-minutes, for example, temporarily increasing the temperature of the downhole ESP assembly 125 for that duration. When the gas slug passes, cooling well fluid may again flow through, causing the temperature of the ESP assembly 125 to drop. In conventional methods, data from the entire event may not be recorded since data is conventionally only collected at ten minute intervals. Thus an operator may not be aware that the event occurred. In contrast, with illustrative embodiments, the gas slug event would be measured in detail, with differences in data measured every five-seconds, for example. An operator would become aware of the gas slug event and how ESP assembly 125 responded to the event. This may provide the operator with better information on how to handle future gas slugs, including appropriate VFD system 100 settings and/or about the fluid content within underground formation 105. Data from the event may be collected without the need for a technician to physically interface with VFD system 100, avoiding shock risk.

A system, apparatus and method for autonomous data collection from variable frequency drives has been described. Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A method for data collection from variable frequency drives (VFD) comprising:
    employing a drive data server in each of a plurality of VFD cabinets, each drive data server collecting high-resolution operational data from a VFD controller that controls an electric submersible pump (ESP) assembly in a downhole well, the high-resolution operational data gathered from the ESP assembly by the VFD controller;
    querying whether the high-resolution operational data meets a delta measured from previously recorded data;
    storing the high-resolution operational data collected in a database file in the drive data server if the delta is affirmatively met;
    detecting a mobile client within Wi-Fi range of each of the plurality of VFD cabinets;

polling each drive data server by the mobile client, the polling of each drive data server triggered by the mobile client entering within the Wi-Fi range of the polled drive data server;

transferring the database file from each drive data server to the mobile client using a first Wi-Fi connection;

storing the database files in the mobile client; and accessing with the mobile client one of a second Wi-Fi connection or a wired network that permits access to a central receiving server at a processing location, when the mobile client is within range of the one of the second Wi-Fi connection or the wired network.

2. The method of claim 1, further comprising:

transmitting the database files from the mobile client to the central receiving server using the one of the second Wi-Fi connection or the wired network, the transmitting triggered by the mobile client entering within range of the one of the second Wi-Fi connection or the wired network; and processing the high-resolution operational data on the central receiving server.

3. The method of claim 2, further comprising using the processed high-resolution operational data on the central receiving server to determine whether a fault has occurred during operation of the ESP assembly.

4. The method of claim 1, wherein the high-resolution operational data comprises information regarding a temperature of an ESP motor in the ESP assembly over a period of three months.

5. The method of claim 1, wherein the high-resolution operational data comprises one of vibration in one axis, vibration in two axes, vibration in three axes, intake pressure, discharge pressure, gauge temperature, motor voltage, motor current per phase, or a combination thereof.

6. The method of claim 1, further comprising overwriting the high-resolution operational data in the database file once the database file is transferred from the drive data server to the mobile client.

7. The method of claim 1, wherein the querying whether the high-resolution operational data meets a delta measured from previously recorded data is conducted one of every one second or every plurality of seconds, where the plurality of seconds is a minute or less.

8. The method of claim 1, wherein the delta is a minimum value change of a variable measured from a most recent recorded value of same variable.

9. The method of claim 1, further comprising transporting the mobile client within Wi-Fi range of each of the plurality of VFD cabinets using one of a robot or a drone vehicle comprising the mobile client.

10. The method of claim 1, further comprising implementing a security access key matching protocol prior to transferring the database file from the drive data server to the mobile client.

11. A system for data collection from variable frequency drives (VFD) comprising:

at least one drive data server, each of the at least one drive data server storing high-resolution VFD operational data from an associated VFD controller when the high-resolution VFD operational data meets a delta, each associated VFD controller operationally coupled to a downhole electric submersible motor;

a mobile client for transporting the stored high-resolution VFD operational data from the at least one drive data server to a central receiving server, the mobile client transportable proximate each associated VFD controller and within Wi-Fi range of the at least one drive data server, the mobile client obtaining the high-resolution VFD operational data from the at least one drive data server when the mobile client is within Wi-Fi range of the at least one drive data server;

a storage medium in each of the mobile client and the at least one drive data server storing the high-resolution VFD operational data and associating the high-resolution VFD operational data with a particular VFD controller of the associated VFD controllers; and an autonomous software program installed on an embedded system in the mobile client and the drive data server, the software program of the mobile client obtaining the high-resolution VFD operational data by polling the drive data server.

12. The system of claim 11, wherein the at least one drive data server polls the associated VFD controller every five seconds to check for the high-resolution VFD operational data that meets the delta.

13. The system of claim 11, wherein the high-resolution VFD operational data comprises one of vibration in one axis, vibration in two axes, vibration in three axes, intake pressure, discharge pressure, gauge temperature, motor voltage, motor temperature, motor current per phase, or a combination thereof.

14. The system of claim 13, wherein the high-resolution VFD operational data is associated with GPS data of the at least one drive data server when stored.

15. The system of claim 11, wherein each of the at least one drive data server and the mobile client comprise a galvanically isolated power supply board and an embedded computer system enclosed in a transportable case.

* * * * *